United States Patent

[11] 3,609,122

| [72] | Inventor | Gerald J. Fleming |
| | | Bowie, Md. |
| [21] | Appl. No. | 795,745 |
| [22] | Filed | Jan. 31, 1969 |
| [45] | Patented | Sept. 28, 1971 |
| [73] | Assignee | The United States of America as represented by the Secretary of the Navy |

[54] NITRO-SUBSTITUTED HYDROXY-BENZENE GLYCIDYL ETHERS AND CURED PRODUCTS THEREOF
9 Claims, No Drawings

| [52] | U.S. Cl. | 260/47 EP, 260/348 R |
| [51] | Int. Cl. | C08g 30/04 |
| [50] | Field of Search | 260/47 EP, 348 |

[56] References Cited
UNITED STATES PATENTS

| 2,181,085 | 11/1939 | Alquist et al. | 260/47 EP |
| 2,712,535 | 7/1955 | Fisch | 260/47 EP |
| 3,431,237 | 3/1969 | Harry | 260/78.4 EP |

OTHER REFERENCES

Handbook of Epoxy Resins Lee et al. (7/1967) page 22– 59 TP1180.E614 C.6

*Primary Examiner*—William H. Short
*Assistant Examiner*—T. Pertilla
*Attorneys*—J. P. Dunlavey and J. O. Tresansky

ABSTRACT: Glycidyl ethers derived from the reaction of an epihalohydrin and a nitro-substituted hydroxy-benzene compound and cured products thereof, which are useful as ablative materials.

NITRO-SUBSTITUTED HYDROXY-BENZENE GLYCIDYL ETHERS AND CURED PRODUCTS THEREOF

BACKGROUND OF THE INVENTION

This invention relates generally to glycidyl ethers and more particularly to nitro-substituted hydroxy-benzene glycidyl ethers and the cured products thereof, which are useful as ablative materials.

In the past, nitro-substituted hydroxy-benzenes have not been employed as the active hydrogen constituent of glycidyl ethers. Conventionally, glycidyl ethers have been the reaction products of such hydroxy-benzenes as resorcinol, hydroquinone, pyrocatechol, alkylated dihydroxy phenols, alkoxylated dihydroxy phenols, trihydroxy phenols and halo-substituted dihydroxy phenols and such compounds as epihalohydrin, dihalohydrin, etc. The manners in which these materials are reacted to produce the ethers are well known to those skilled in the art. Normally, however, the presence of any nitro substitutes on the aromatic nuclei of these glycidyl ethers is not at all desirable due to the well-established oxidizing effects of the nitro group, which tend to adversely and uncontrollably degrade and break down the ethers, as well as the cured products thereof, under elevated temperatures and especially under ablative conditions.

SUMMARY OF THE INVENTION

Accordingly, one object of this invention is to provide novel glycidyl ethers which are the reaction products of nitro-substituted hydroxy-benzenes and an epihalohydrin.

Another object of this invention is to provide novel epoxy resins especially suitable as ablative materials which are the cured materials of the reaction products of nitro-substituted hydroxy-benzenes and an epihalohydrin.

These and other objects are accomplished by providing a glycidyl ether which is the reaction product of a nitro-substituted hydroxy-benzene of the general formula I

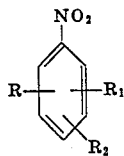

wherein $R$ is OH, $R_1$ and $R_2$ are H or OH, and an epihalohydrin by employing any of the conventional means known for preparing glycidyl ethers of this type. The glycidyl ethers may be cured employing any of the conventional curing agents known for epoxy resins.

DESCRIPTION OF THE PREFERRED EMBODIMENTS

The glycidyl ethers of this invention can be represented structurally by formula II given below. Formula II

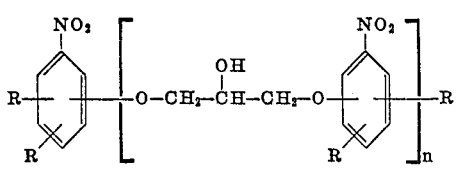

wherein R can be H, $-O-CH_2-CH\overset{O}{\diagup\!\diagdown}CH_2$ and OH, and $n$ can vary from 0-10.

Preparation of the compounds falling within the scope of formula II is conveniently accomplished by reacting by conventional means, such as base condensation, an epihalohydrin with a compound falling within the scope of formula I. Specific compounds falling within the scope of formula I are, for example, O-nitrophenol, m-nitrophenol, p-nitrophenol, 2-nitro-4-hydroxyphenol, 2-nitroresorcinol, 5-nitroresorcinol, 4-nitroresorcinol, 3-nitropyrocatechol, 4-nitropyrocatechol, 5-nitropyrogallol and the like. In this reaction each phenolic hydroxyl group is replaced, theoretically, by a glycidyl radical.

The glycidyl ethers of this invention can be cured below about 150° C. to thermally stable and excellent ablative resin materials by employing any of the known epoxy curing agents with or without conventional catalysts used for this purpose. Some of these curing agents are, for example, polyamines, polycarboxylic acids and anhydrides thereof and more specifically compounds such as triethylene tetramine, m-phenylene diamine, p,p'-diamino diphenyl diphenyl sulfone, p,p'-methylene dianiline, tetrahydrophthalic anhydride, trimellitic anhydride, boron trifluoride monoethyl amine, 3,3',4,4'-benzophenone tetracarboxylic dianhydride, methyl norbornene-2,3-dicarboxylic anhydride and the like. The glycidyl ethers of this invention may also be thermally polymerized without a catalyst or curing agent at temperatures above about 150° C. to yield highly cross-linked, thermally stable materials.

The cured products of formula II perform unusually well as ablative materials. They are found to degrade in a controlled manner to consume heat and are capable of forming strong and substantial self-protective carbonaceous chars. The cured products of formula II having an $n$ value of from 0 to 4 are found to perform most satisfactorily.

The general nature of the invention having been set forth, the following example is presented as a specific illustration thereof. It will e understood that the invention is not limited to this example but is susceptible to various modifications that will be recognized by one of ordinary skill in the art.

EXAMPLE

The following is a typical synthesis although different ratios of reactants and base have been used, as well as, different times and temperatures.

To a three-neck flask fitted with electric stirrer, reflux condenser and dropping funnel were added 77.56 g. (0.5 mole) of recrystallized 2-nitro resorcinol and 1,851 g. (20.0 moles) of epichlorohydrin. To this solution at 75° C., 44.0 g. (1.1 moles) NaOH in 100 ml. of water were added dropwise over a period of 50 minutes. The reaction was then run an additional hour at 80° C. before stopping. The organic layer was separated from the water layer and was washed twice with 300 ml. of water each time. The organic portion was then treated with $MgSO_4$ and allowed to stand at room temperature overnight. The $MgSO_4$ was separated from the organic phase which was then vacuum distilled to 130° C. to remove the epichlorohydrin. The resultant diglycidyl ether of 2-nitro resorcinol is a viscous, red-brown material with an epoxide equivalent weight of 510 ($n=3.5$). This material was cured by admixing 100 parts by weight of the 2-nitro resorcinol diglycidyl ether with 30 parts by weight of methyl norbornene-2,3-dicarboxylic anhydride (NMA) and 1.0 part by weight of N,N-benzyldimethylamine catalyst. This mixture was mixed at 100° C. and then cured 5 hours at 100° C., 16 hours at 150° C. and 2 hours at 175° C.

Thermogravimetrical tests of the cured product of the 2-nitro resorcinol diglycidyl ether of the present invention have demonstrated a char yield of 28 percent as compared with a 10 percent yield demonstrated by the cured product resorcinol diglycidyl ether.

For increased ablative performance and other desirable effects the cured products of the present invention may also be admixed with other conventional ablative materials.

Obviously, numerous modifications and variations of the present invention are possible in the light of the above teachings. It is therefore to be understood that within the scope of the appended claims the invention may be practiced otherwise than as specifically described herein.

What is claimed and desired to be secured by Letters Patent of the United States is:

1. A glycidyl ether having the formula:

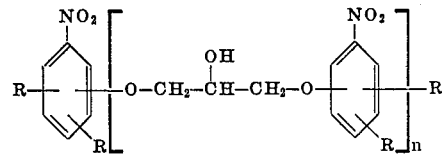

wherein R is a member selected from the group consisting of H, OH, and

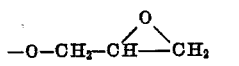

and n has a value of 0 to 10 inclusive.

2. A glycidyl ether as defined in claim 1 wherein n has a value of 0 to 4 inclusive.

3. A glycidyl ether as defined in claim 1 which has the formula:

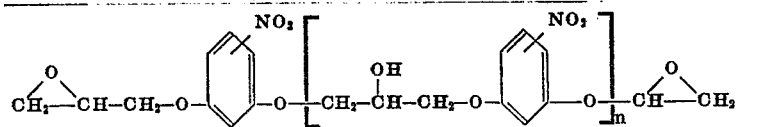

wherein n has a value of 0 to 10.

4. A glycidyl ether as defined in claim 3 wherein n has a value of 0 to 4 inclusive.

5. The reaction product comprising the glycidyl ether defined in claim 1 cured with a curing agent selected from the group consisting of a polyamine, a polycarboxylic acid and an anhydride thereof.

6. The reaction product comprising the glycidyl ether defined in claim 3 cured with a curing agent selected from the group consisting of a polyamine, a polycarboxylic acid and an anhydride thereof.

7. The product obtained by the process of heating the glycidyl ether defined in claim 1 to a temperature sufficiently above about 150° C. so as to thermally polymerize said glycidyl ether defined in claim 1.

8. The reaction product comprised of the glycidyl ether defined in claim 1 cured with a curing agent selected from the group consisting of triethylene tetramine, m-phenylene diamine, p,p'-diamino-diphenylsulfone, p,p'-methylene dianiline, tetrahydrophthalic anhydride, trimellitic anhydride, boron trifluoride monoethylamine, 3,3',4,4'-benzophenone tetracarboxylic dianhydride, and methyl norbornene-2,3-dicarboxylic anhydride.

9. The reaction product comprising the glycidyl ether defined in claim 3 cured with a curing agent selected from the group consisting of triethylene tetramine, m-phenylene diamine, p,p'-diamino-diphenylsulfone, p,p'-methylene dianiline, tetrahydrophthalic anhydride, trimellitic anhydride, boron trifluoride monoethylamine, 3,3',4,4'-benzophenone tetracarboxylic dianhydride, and methyl norbornene-2,3-dicarboxylic anhydride.